United States Patent [19]
Farwell et al.

[11] Patent Number: 5,444,766
[45] Date of Patent: Aug. 22, 1995

[54] MOBILE-SYNCHRONIZED HANDOFF IN A WIRELESS COMMUNICATIONS SYSTEM

[75] Inventors: Charles Y. Farwell, Denver; Richard D. Miller, Northglenn; Richard A. Windhausen, Boulder, all of Colo.

[73] Assignee: AT&T Corp., Murray Hill, N.J.

[21] Appl. No.: 131,041

[22] Filed: Oct. 1, 1993

[51] Int. Cl.6 .................... H04Q 7/22; H04M 11/00
[52] U.S. Cl. ................... 379/60; 455/33.2; 455/56.1; 379/63; 379/59
[58] Field of Search ............ 455/33.1, 33.2, 54.1, 455/56.1; 379/60, 59, 58, 63

[56] References Cited

U.S. PATENT DOCUMENTS

| | | | |
|---|---|---|---|
| 5,101,501 | 3/1992 | Gilhousen et al. | 455/33.2 |
| 5,243,641 | 9/1993 | Evans et al. | 379/60 |
| 5,243,653 | 9/1993 | Malek et al. | 379/59 |
| 5,267,261 | 11/1993 | Blakeney, II et al. | 375/1 |

FOREIGN PATENT DOCUMENTS

| | | | |
|---|---|---|---|
| 3132537 | 6/1988 | Japan | 455/33.2 |
| 173925 | 3/1989 | Japan | 379/60 |
| 575531 | 3/1993 | Japan | 455/33.2 |
| 9107020 | 5/1991 | WIPO | H04B 7/14 |
| 9107036 | 5/1991 | WIPO | H04L 27/30 |

Primary Examiner—Curtis Kuntz
Assistant Examiner—William G. Trost
Attorney, Agent, or Firm—David Volejnicek

[57] ABSTRACT

An arrangement for effecting call handoffs in a wireless communications system (FIG. 1 ) in a substantially glitchless manner. The arrangement relies on the mobile terminal (4) that is involved in a handoff to trigger the handoff by transmitting a handoff coordination signal simultaneously to the base stations (1, 2) that are involved in the handoff. The base stations receive the signal substantially simultaneously, and in response the base station that has been serving the mobile terminal's call ceases to do so while the base station that is henceforth to serve the mobile terminal's call commences to do so at the same instant in time.

16 Claims, 3 Drawing Sheets

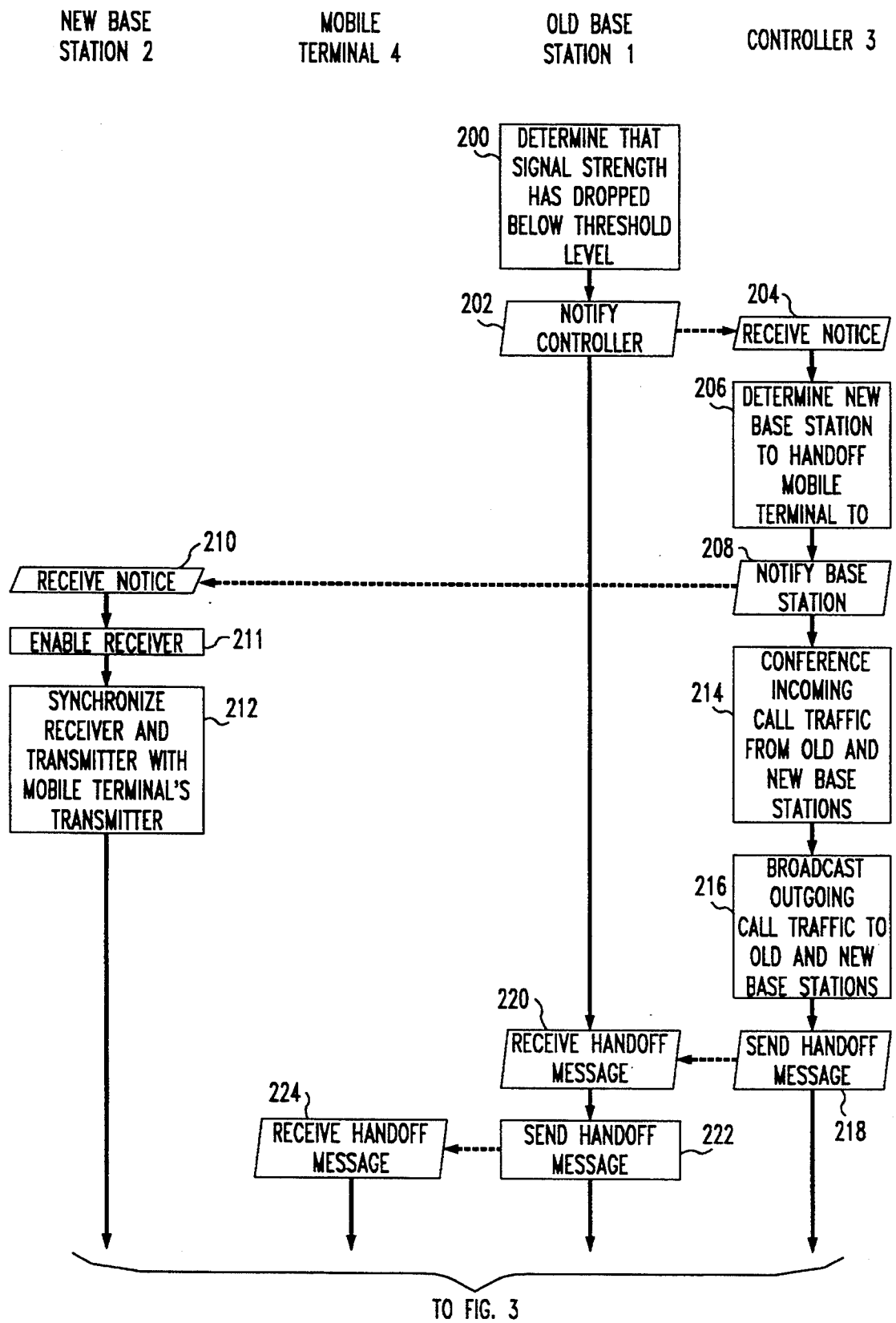

MOBILE-SYNCHRONIZED HANDOFF IN A WIRELESS COMMUNICATIONS SYSTEM

TECHNICAL FIELD

This invention relates to mobile wireless communications systems, such as cellular systems and personal communications systems (PCS).

BACKGROUND OF THE INVENTION

User mobility is central to mobile wireless communications systems. Consequently, a wireless system user frequently is in motion during an active call. In such cases, the user may pass out of range of the base station with which the user's station set (also commonly referred to as a user terminal, mobile terminal, or handset) is presently communicating. Many wireless systems provide the ability for a call to undergo a "handoff," where the system moves the call from the old base station that is presently serving the call to a new base station closer to the user's present position. It is not unusual for the parties to the call to hear an audible glitch as the call is handed off, due to poor coordination of the timing of the handoff. This glitch is usually caused by lost or garbled voice samples during the switch-over as the old base station stops transmitting and receiving and the new base station begins.

Traditional approaches to solving this problem often attempt to eliminate the glitch within the wireless system by temporarily having both the new and the old base stations receive the call traffic from the mobile terminal and conferencing the traffic received from the two base stations during the handoff. This may reduce the glitch heard by the other party to the call but does not eliminate the glitch heard by the mobile wireless user whose motion caused the handoff to occur. Other approaches place undesirable constraints on system operation or user mobility.

Newer digital cellular offerings smooth the handoff process by a mechanism known as "soft" handoff, where traffic passed to and from the mobile terminal is replicated by both the new and the old base stations during the handoff. By replicating the traffic, voice samples and signaling messages are less likely to be lost, and glitches are reduced. However, replicating the traffic and handling the replicas within the wireless system is complex and costly, requiring expensive hardware for traffic duplication and selection and duplicate-traffic synchronization. Moreover, it is only applicable to certain technologies - i.e., CDMA.

SUMMARY OF THE INVENTION

This invention is directed to solving these and other problems and disadvantages of the prior art. Generally, the invention is an arrangement for effecting call handoffs in wireless communications systems in a substantially glitchless manner. We have realized that a principal reason for the occurrence of glitches during handoffs is the fact that the synchronization of the handoff, i.e., the timing of the instant of occurrence of the handoff at the various units involved in the handoff, is traditionally coordinated either by the wireless system controller or by one of the base stations. Inherently, there are signal propagation delays between the system controller and the base stations involved in the handoff or between the base station that controls the handoff synchronization and the other base station involved in the handoff. There may also be timing differences - asynchrony - between the base stations involved in the handoff. As a consequence, the base stations that are involved in a handoff which is being synchronized by the system controller or by one of the base stations typically perform their handoff actions at slightly different instants in time, resulting in the occurrence of a glitch.

However, we have determined that by making the mobile terminal that is being handed off from the one base station to the other responsible for coordinating of handoff synchronization, the glitch may be substantially or totally eliminated. Because the signal propagation delays from the mobile terminal to the base stations are effectively identical, both base stations - as well as the mobile terminal, if necessary - are caused by the mobile terminal to perform their handoff actions at effectively the same instant in time, thereby avoiding the occurrence of a discernible (e.g. audible) glitch. Another advantage is that this arrangement reduces the need for close synchronization among the base stations of their wireline-side operations.

Specifically according to the invention, a mobile terminal for a wireless communications system wherein base stations involved in a handoff of the mobile terminal from one of the base stations to another of the base stations respond to receipt of a handoff coordination signal by performing the handoff, comprises means for generating the handoff coordination signal and means responsive to the generation for transmitting the generated handoff coordination signal simultaneously to both the one and the other base stations to cause both of the base stations to trigger performance of the handoff. Correspondingly, an individual base station for the above-characterized wireless communications system comprises means for receiving the handoff coordination signal from the mobile terminal involved in the handoff between the individual base station and another base station, and means responsive to the receipt for performing the handoff of the mobile terminal between the individual base station and the other base station. Accordingly, in such a wireless communications system, the handoff coordination signal is broadcast (e.g., via a single transmitter) from the mobile terminal simultaneously to both base stations involved in the handoff, for substantially simultaneous receipt by both of those base stations. In response to receiving the handoff coordination signal, the one base station is caused to cease serving the mobile terminal. And in response to receiving the handoff coordination signal, the other base station is caused to commence serving the mobile terminal. The timing of the handoff is thus coordinated by the mobile terminal and is performed substantially simultaneously by both of the base stations involved in the handoff, with the consequence that a handoff-induced glitch is substantially or totally eliminated.

These and other advantages and features of the invention will become more apparent from the following description of an illustrative embodiment of the invention taken together with the drawing.

BRIEF DESCRIPTION OF THE DRAWING

FIGS. 2 and 3 are a flow diagram of an illustrative example of the invention as implemented in the system of FIG. 1;

DETAILED DESCRIPTION

Figure 1:
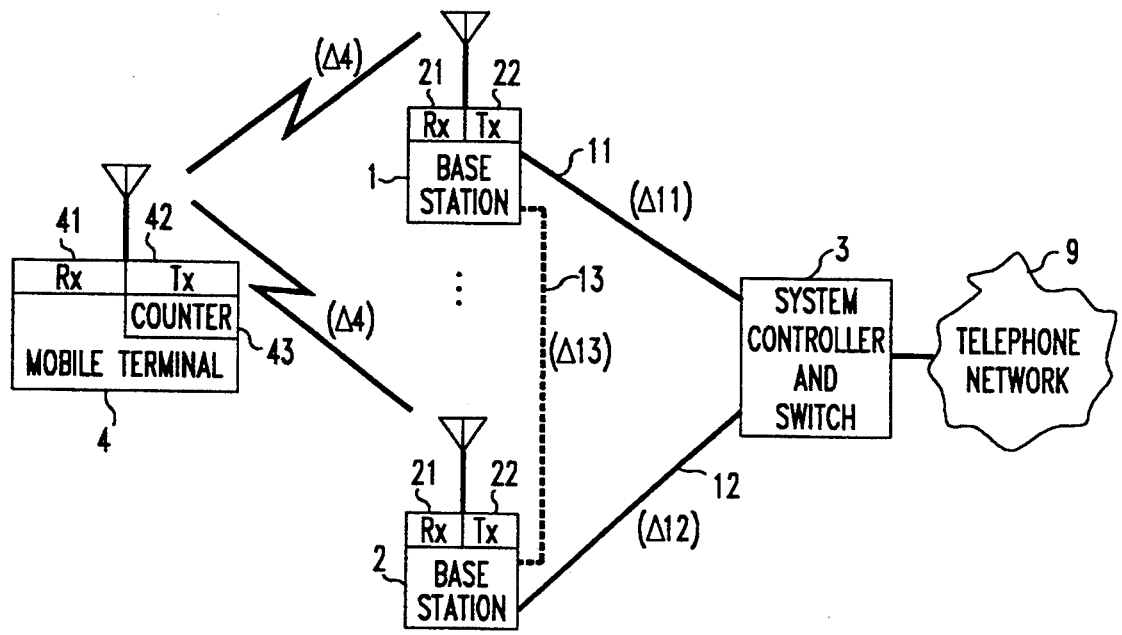
FIG. 1 is a block diagram of a conventional mobile wireless communications system in which an illustrative example of the invention may advantageously be implemented.
Figure 4:
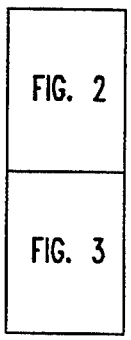
FIG. 4 shows the arrangement of FIGS. 2 and 3 to form a single figure.

FIG. 1 shows a conventional mobile wireless communications system. The system includes a plurality of geographically-dispersed base stations 1 and 2, of which two are shown, which provide over-the-air telecommunications services to mobile terminals 4, of which one is shown. Base stations 1 and 2 are connected by communications links 11 and 12 to a system controller and switch 3, referred to herein as controller 3 for short. Controller 3 controls the operation of the system of FIG. 1, setting up and tearing down calls and providing communications connections between mobile terminals 4 or between a mobile terminal 4 and a conventional telephone network 9.

The system of FIG. 1 may be any one of a number of known conventional systems. For example, it may be a cellular system that covers a large geographical area, such as a city or a region, and provides services to mobile terminals 4 that are typically mounted in automobiles. Or, it may be a personal communications system (PCS) that covers a small geographical area, such as a single building, and provides services to mobile terminals 4 that are portable handsets carried by users. In any case, the distances between a mobile terminal 4 and base stations 1 and 2 that are involved in a handoff with the mobile terminal 4 are likely to be small in comparison with the distance between base stations 1 and 2 and controller 3. Moreover, over-the-air signal propagation is likely to be faster than propagation through land lines and electronic equipment that generally constitute links 11 and 12. The propagation delays through links 11 and 12 may also be different from each other and may change over time. Signal propagation delays between base stations 1 and 2 are exacerbated by the fact that the base stations normally must communicate with each other through controller 3, resulting in propagation delays that are at least the sum of the propagation delays over the links 11 and 12. And even if base stations 1 and 2 are interconnected by an optional direct link 13, the propagation delay thereof is normally not negligible and has the same undesirable characteristics as the propagation delays of links 11 and 12. Consequently, signal propagation delays between mobile terminal 4 and base stations 1 and 2 (designated as $\Delta 4$) may be considered for the practical purposes of this discussion to be equal with each other and negligible in comparison with either the propagation delays between controller 3 and base stations 1 and 2 (designated as $\Delta 11$ and $\Delta 12$, respectively) or the propagation delay between base stations 1 and 2 (designated as $\Delta 13$). These characteristics of delays $\Delta 11$–$\Delta 13$ make it very difficult to produce glitch-less handoffs when the handoffs are synchronized either by controller 3 or one of base stations 1 and 2. In contrast, we have realized that the characteristics of delays $\Delta 4$ make it simple to produce relatively glitch-less handoffs when handoffs are synchronized by mobile terminals 4.

Figure 3:
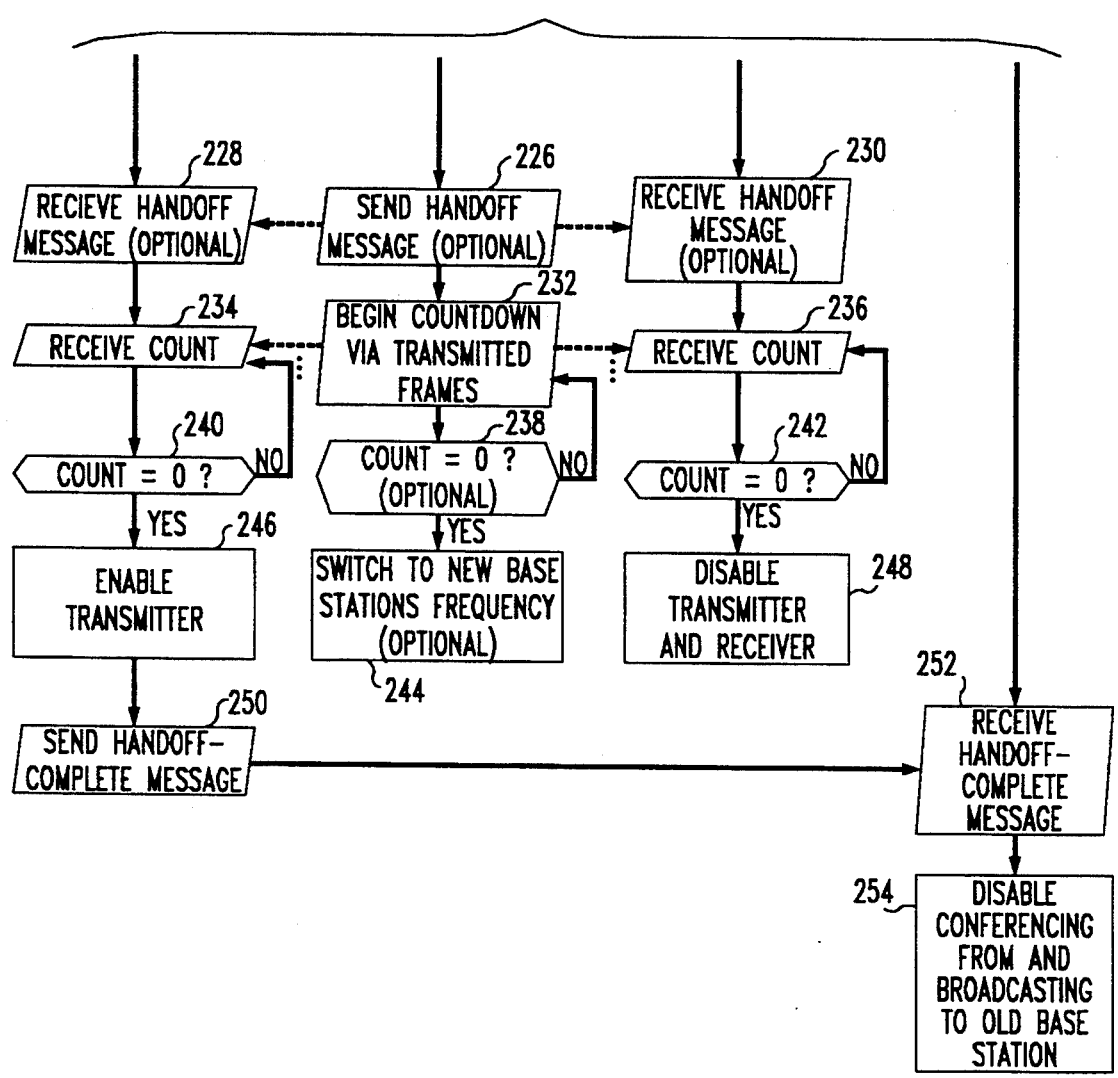

Accordingly, base stations 1 and 2, controller 3, and mobile terminal 4 are adapted to implement the handoff procedure flowcharted in FIGS. 2 and 3 which embodies an illustrative example of the invention. Base stations 1 and 2, controller 3, and mobile terminal 4 are conventionally digital-processor-based and stored-program-controlled units. Consequently, the procedure of FIGS. 2 and 3 is readily implemented via programs stored in those units memories and executed therefrom by their processors.

The handoff procedure begins when a determination is made that the signal strength of a call at a receiver has dropped below a threshold level, at step 200. While FIG. 2 shows the determination being made at old base station 1 that is presently serving the call with respect to its own receiver Rx21, alternatively it may be made at mobile terminal 4 that is a participant in the call with respect to its receiver Rx41. In either case, the unit that makes the determination notifies controller 3, at step 202.

Controller 3 receives the notice, at step 204, and responds by determining which base station to handoff the call to, at step 206. Conventionally, controller 3 requests all base stations in the vicinity of mobile terminal 4 to measure at their receivers Rx21 the strength of signals transmitted by transmitter Tx42 of mobile terminal 4 and report the results to controller 3, whereupon controller 3 selects the base station that is receiving the strongest signals as the new base station for serving the call. Controller 3 then notifies the determined new base station 2 of its selection, at step 208.

New base station 2 receives the notice, at step 210, and responds thereto by enabling its receiver Rx21 to receive transmissions from mobile terminal 4, at step 211, and using the received transmissions to synchronize its receiver Rx21 and transmitter Tx22 with transmitter Tx42 of mobile terminal 4, at step 212. The enabled receiver Rx21 of new base station 2 commences to send the received transmissions to controller 3.

Controller 3 is now receiving call traffic of the mobile terminal's call from both base stations 1 and 2, and it conferences this incoming traffic prior to sending it to the other party to the call, at step 214. Controller 3 also commences to broadcast call traffic received from that other party to both base stations 1 and 2, at step 216. Controller 3 then sends a handoff message to base station 1 that is presently handling the call, at step 218, to notify it that the call is about to be handed off to new base station 2.

Base station 1 receives the handoff message, at step 220, and in turn sends an equivalent thereof to mobile terminal 4, at step 222, to notify mobile terminal 4 of the handoff. Receiver Rx41 of mobile terminal 4 receives the handoff message, at step 224, and mobile terminal 4 optionally responds by transmitting a handoff message, at step 226, to inform both base stations 2 and 1, at steps 228 and 230, respectively, that it is ready for the handoff. Optionally, steps 226–230 may be eliminated, and the same function may be served by steps 232—236.

Figure 5:
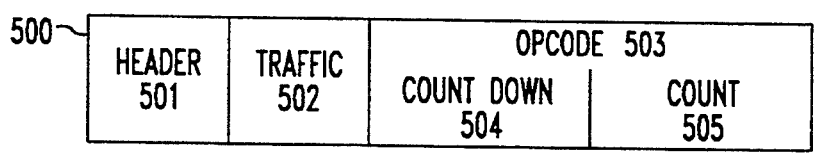
FIG. 5 is a block diagram of a frame format of frames transmitted by the mobile terminal of the system of FIG. 1 to implement the example of the invention shown in FIGS. 2 and 3.

Mobile terminal 4 now assumes control of coordinating the synchronization of the instant of occurrence of the handoff with base stations 1 and 2, by transmitting a handoff coordination signal to base stations 1 and 2. Illustratively, mobile terminal 4 does this by beginning to generate and transmit a count-down to the instant of handoff to base stations 1 and 2, at step 232. Mobile terminal 4 normally communicates with base stations by transmitting frames of information thereto. Such a frame 500 is shown in FIG. 5. It contains a header field 501 that serves, inter alia, to associate the frame with a particular call, a traffic field 502 that carries a segment of call traffic, and an opcode field 503 that is used to convey control and signaling information. According to this illustrative embodiment of the invention, mobile terminal 4 generates a sequentially-decreasing count 505 via a counter 43 and transmits this count-down information to base stations 1 and 2 by including in opcode field 503 of transmitted frames 500 a count-down opcode 504 accompanied by count 505. Illustratively, the count commences at some value, e.g., 20, in a first frame that includes count-down opcode 504, and is decremented by counter 43 of mobile terminal 4 in each subsequent transmitted frame 500.

Each transmitted frame 500 carrying a count 505 is received substantially simultaneously by receivers Rx21 of both base stations 1 and 2, at steps 234 and 236, respectively. Base stations 1 and 2 check the received count 505 to determine whether its value has reached 0, at steps 240 and 242, respectively. If not, base stations 2 and 1 return to steps 234 and 236, respectively, to receive the next count 505. The value of the count informs base stations 1 and 2 of how imminent the moment of handoff is and enables them to get prepared for effecting the handoff at that precise moment. If the count has reached zero, as determined at steps 240 and 242, respectively, it is an indication that the moment of handoff has arrived, and base stations 2 and 1 respond by performing the handoff at that moment, at steps 246 and 248, respectively. Base station 1 that had been serving the call is caused to disable its transmitter Tx22 and receiver Rx21, at step 248, thereby ceasing to serve the call, while new base station 2 enables its transmitter Tx22, at step 246, thereby commencing to fully serve the call at that same instant. Steps 246 and 248 take place effectively at the same instant of time, resulting in a substantially glitchless handoff.

If the call continues to proceed with new base station 2 on the same radio frequencies as it had proceeded on with old base station 1, no action at the instant of handoff is required of mobile terminal 4. However, if the handoff involves a change in the transmit and/or receive frequency, then mobile terminal 4 also monitors the value of count 505 of its transmitted frames 500 to determine, at step 238, if that value has reached zero. If the value has not reached zero, mobile terminal 4 returns to step 232 to transmit another frame 500 with the next-lower value of count 505. If the value has reached zero, mobile terminal 4 switches its transmit and/or receive frequency from that used by old base station 1 to that used by new base station 2. Step 244 takes place effectively at the same instant of time as steps 246 and 248, resulting in a substantially glitchless handoff.

Following occurrence of the handoff, new base station 2 sends a handoff-complete message to controller 3, at step 250. Controller 3 receives the message, at step 252, and responds by disabling the conferencing and broadcasting of call traffic with respect to base stations 1 and 2 that it had commenced at steps 214 and 216, removing old base station 1 from the conference and leaving only base station 2 to convey call traffic to and from mobile terminal 4, at step 254. The handoff is thus completed, and the call proceeds with service from new base station 2 as it had prior to the handoff with service from old base station 1.

Of course, various changes and modifications to the illustrative embodiment described above will be apparent to those skilled in the art. For example, steps 232–242 of FIG. 3 could be eliminated and their function could be served by steps of 226–230. Also, step 250 of FIG. 3 could instead be performed by the mobile terminal or by the old base station. Furthermore, small systems may be able to coordinate a handoff between base stations without any involvement of controller 3 therein at all. Such changes and modifications can be made without departing from the spirit and the scope of the invention and without diminishing its attendant advantages. It is therefore intended that such changes and modifications be covered by the following claims.

We claim:

1. In a wireless communications system, a method of coordinating a handoff of a call involving a mobile terminal from a first base station to a second base station, comprising the steps of:

transmitting a handoff coordination signal from the mobile terminal simultaneously to both the first base station which is presently transmitting the call to the mobile terminal and the second base station which is presently not transmitting the call to the mobile terminal;

receiving the handoff coordination signal substantially simultaneously at both the first and the second base stations;

in response to the receipt, the first base station ceasing to transmit the call to the mobile terminal at an instant in time; and in response to the receipt, the second base station commencing to transmit the call to the mobile terminal at effectively same said instant in time;

whereby timing of the handoff is coordinated by the mobile terminal and is performed substantially simultaneously by both the first and the second base stations.

2. The method of claim 1 wherein:

the step of transmitting a handoff coordination signal comprises the step of transmitting a sequence of signals each having a different value including a predetermined value;

the step of ceasing to transmit comprises the step of upon receipt of the sequence of signals including the signal having the predetermined value, the first base station ceasing to transmit the call to the mobile terminal; and the step of commencing to transmit comprises the step of upon receipt of the sequence of signals including the signal having the predetermined value, the second base station commencing to transmit the call to the mobile terminal.

3. The method of claim 2 wherein: the step of transmitting a sequence of signals comprises the step of transmitting a sequence of frames each including a count field having a different count.

4. The method, of claim 3 wherein: the step of transmitting a sequence of call traffic-carrying frames comprises the step of transmitting the sequence of said frames each including a successively changing count wherein the predetermined value is a predetermined count.

5. A wireless communications system comprising:

a mobile terminal;

a first and a second base station for serving a call involving the mobile terminal;

means in the mobile terminal for transmitting a handoff coordination signal simultaneously to both the first base station which is presently transmitting the call to the mobile terminal and the second base station which is presently not transmitting the call to the mobile terminal to trigger a handoff of the call involving the mobile terminal from the first base station to the second base station;

means in the first base station responsive to receipt of the handoff coordination signal for causing the first base station to cease transmitting the call to the mobile terminal at an instant in time; and means in the second base station responsive to receipt of the handoff coordination signal for causing the second base station to commence transmitting the call to the mobile terminal at effectively same said instant in time;

whereby timing of the handoff is coordinated by the mobile terminal and is performed substantially simultaneously by both the first and the second base stations.

6. The system of claim 5 wherein:

the transmitting means in the mobile terminal comprise means for transmitting a sequence of signals each having a different value, including a predetermined value that triggers the handoff;

the causing means in the first base station comprise means responsive to receipt of the sequence of signals including the signal having the predetermined value, for causing the first base station to cease transmitting the call to the mobile terminal; and the causing means in the second base station comprise means responsive to receipt of the sequence of signals including the signal having the predetermined value, for causing the second base station to commence transmitting the call to the mobile terminal.

7. The system of claim 6 wherein: the sequence of signals comprises a sequence of frames each including a count field having a different count.

8. The system of claim 7 wherein: the frames of the sequence of frames each includes a successively changing count, and the predetermined value is a predetermined count.

9. A mobile terminal for a wireless communications system wherein base stations involved in a handoff of a call involving the mobile terminal from one of the base stations to another of the base stations respond to receipt of a handoff coordination signal by performing the handoff, comprising:

means for generating the handoff coordination signal; and means responsive to the generation for transmitting the generated handoff coordination signal simultaneously to both the one base station which is presently transmitting the call to the mobile terminal and the other base station which is presently, not transmitting the call to the mobile terminal to cause the one base station to cease transmitting the call to the mobile terminal at an instant in time and to cause the other base station to commence transmitting the call to the mobile terminal at effectively same said instant in time;

so that timing of the handoff is coordinated by the mobile terminal and is performed substantially simultaneously by both the one and the other base stations.

10. The mobile terminal of claim 9 wherein: the generating means comprise means for generating a sequence of signals each having a different value, including a predetermined value that triggers the handoff; and the transmitting means transmit the generated sequence of signals.

11. The mobile terminal of claim 10 wherein: the sequence of signals comprises a sequence of frames each including a count field having a different count.

12. The mobile terminal of claim 11 wherein: the frames of the sequence of frames each includes a successively changing count, and the predetermined value is a predetermined count.

13. An individual base station for a wireless communications system wherein base stations involved in a handoff of a call involving a mobile terminal from one of the base stations to another of the base stations respond to receipt of a handoff coordination signal by performing the handoff, comprising:

means for receiving the handoff coordination signal from a mobile terminal involved in a call that is being handed off between the individual base station and another base station wherein a first one of the individual base station and the other base station is presently transmitting the call to the mobile terminal and a second one of the individual base station and the other base station is presently not transmitting the call to the mobile terminal, the handoff signal having been transmitted by the mobile terminal simultaneously to both the individual base station and the other base station to trigger performance of the handoff wherein the first one of the base stations ceases to transmit the call to the mobile terminal at an instant in time and the second one of the base stations commences to transmit the call to the mobile terminal at effectively same said instant in time; and means responsive to the receipt for performing the handoff of the call between the individual base station and the other base station at said instant in time;

so that timing of the handoff is coordinated by the mobile terminal and is performed substantially simultaneously by both the first and the second base stations.

14. The base station of claim 13 wherein:

the receiving means receive from the mobile terminal a sequence of signals each having a different value, including a predetermined value to trigger the handoff; and the means for performing the handoff comprise means responsive to receipt of the sequence of signals including the signal having the predetermined value, for performing the handoff of the call between the individual base station and the other base station upon receipt of the signal having the predetermined value.

15. The base station of claim 14 wherein: the sequence of signals comprises a sequence of frames each including a count field having a different count.

16. The base station of claim 15 wherein: the frames of the sequence of frames each includes a successively changing count, and the predetermined value is a predetermined count.

* * * * *